Figure 1:
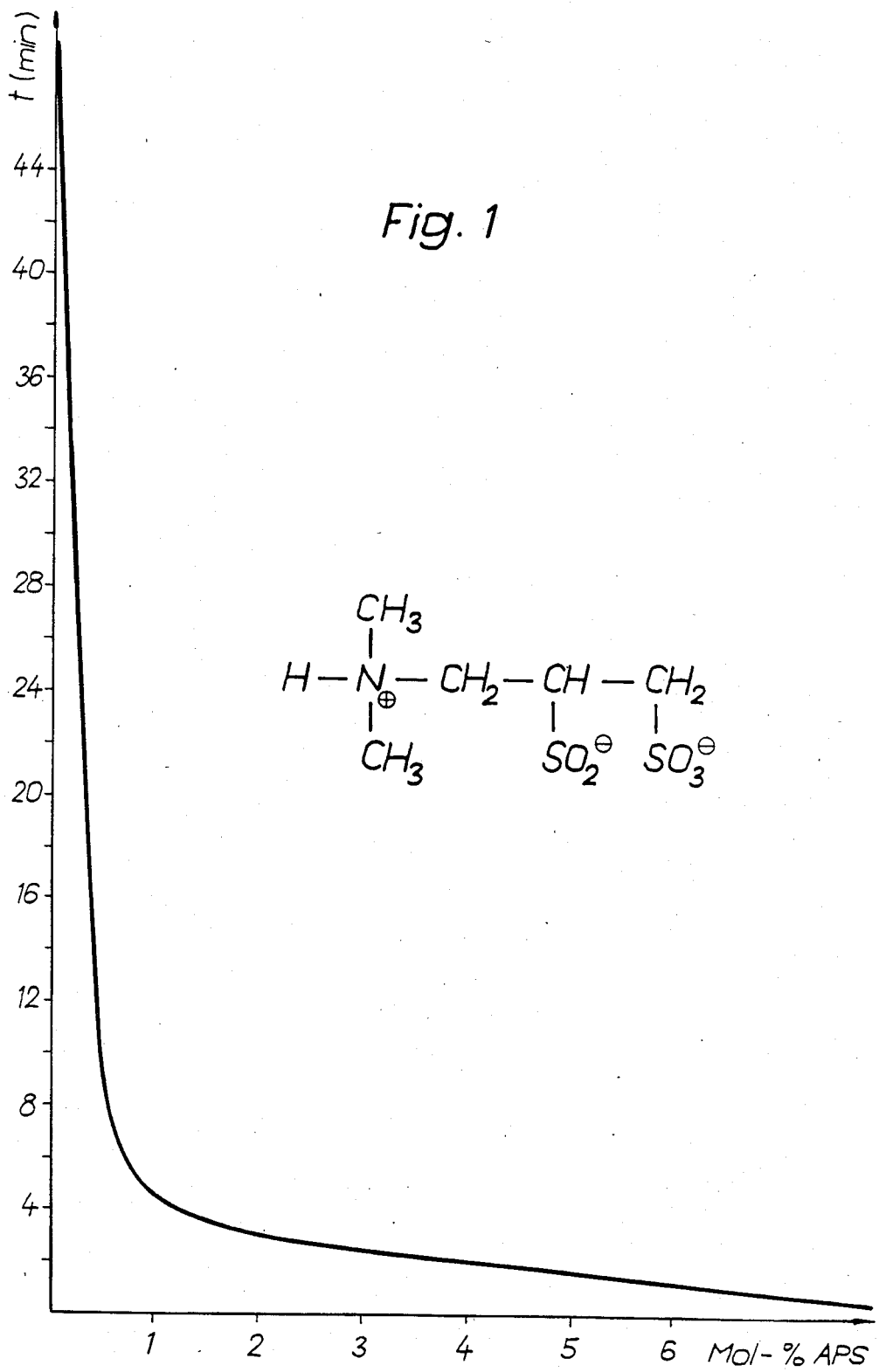

United States Patent [19]

Ballschuh et al.

[11] Patent Number: 4,687,602

[45] Date of Patent: Aug. 18, 1987

[54] NOVEL 2-SUBSTITUTED 3-SULFOPROPYL-AMMONIUM BETAINES AND PROCESSES FOR MAKING SAME

[75] Inventors: Detlef Ballschuh; Horst Seibt; Jochen Rusche; Roland Ohme, all of Berlin, German Democratic Rep.

[73] Assignee: Akademie der Wissenschaften der DDR, Berlin, German Democratic Rep.

[21] Appl. No.: 748,155

[22] Filed: Jun. 24, 1985

[30] Foreign Application Priority Data

Jun. 1, 1984 [DD] German Democratic Rep. ... 263723
Jun. 1, 1984 [DD] German Democratic Rep. ... 263718

[51] Int. Cl.$^4$ ............................................. C07C 143/14
[52] U.S. Cl. ................................. 260/501.12; 252/554
[58] Field of Search ..................... 260/501.12

[56] References Cited

U.S. PATENT DOCUMENTS

| | | | |
|---|---|---|---|
| 3,198,822 | 8/1965 | Mannheimer | 260/501.12 |
| 3,200,127 | 8/1965 | Klass | 260/501.12 |
| 4,267,123 | 5/1981 | Chen et al. | 260/501.12 |

FOREIGN PATENT DOCUMENTS

| | | |
|---|---|---|
| 1117565 | 11/1961 | Fed. Rep. of Germany . |
| 0154443 | 3/1982 | German Democratic Rep. . |
| 2007396 | 8/1983 | German Democratic Rep. . |
| 225989 | 8/1985 | German Democratic Rep. . |

Primary Examiner—J. E. Evans
Attorney, Agent, or Firm—Michael J. Striker

[57] ABSTRACT

Novel 2-substituted 3-sulfo propyl-ammonium betaines are disclosed which have the formula

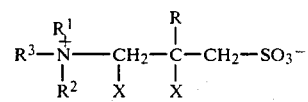

and which are obtained in accordance with the invention by reacting allyl-or methallyl ammonium salt with hydrogen sulfite in the pH-value- of 2,0 to 4,0 in the presence of a peroxo disulfates, if need be, in combination with other oxidation agents in watery solution.

The novel compounds are useable in a wide pH-value effective tensides or may be used as reactive intermediary products.

1 Claim, 2 Drawing Figures

NOVEL 2-SUBSTITUTED 3-SULFOPROPYL-AMMONIUM BETAINES AND PROCESSES FOR MAKING SAME

The invention relates to novel 3-sulfopropyl-ammonium betaines, which in 2-position have a sulfinate group (sulfobetaine sulfinate) or a sulfonate group (sulfobetaine sulfonate) and moreover, if need be, a methyl group, as well as processes for making these compounds.

Sulfobetaine sulfinates are novels as a substance class. Processes for making other betaine sulfinates are also not known.

However, processes for making different structures sulfo-betaine sulfonates were already described. Such compounds with nonvicinal sulfonic acid groups can be obtained two ways, either by reacting hydroxy ethyl amino compounds with two Moles propansulton /J. Amer. Oil Chemists Soc. 55, 741 (1978)/ or in that triallyl- or tetra allyl ammonium salts in the pH-value 5 to 8 are brought to a reaction simultaneously with salts of the sulfurous acid and an oxidation agent, for example, air oxygen (DD-WP 200 739 6).

The disadvantages of these known processes consist in that in the first case the extremely cancerogenic propansulton is used which must be treated with utmost protective measures, and that in the second case the use of the use of allyl ammonium compounds requires more than two allyl substitutes. A further common disadvantage of these processes consists in that a further hydrocarbon residue must be introduced forcibly with the $SO_3^-$ group.

Hitherto, very different structures as reaction products of unsaturated aliphatic compounds with hydrogen sulfites were described. With single olefines a radical difunctionalsation occurs if, under the influence of organic peroxides or air in the pH-value range 4 to 9, hydrogen sulfites are brought to a reaction. In long reaction times of one to a plurality of hours products were obtained in the haet with a terminal sulfonic acid group and vicinal sulfinate group as a presumable, but nonproven structure (DE-PS 11 17 565).

Under similar conditions isosulfonates were obtained from allyl ammonium salts after very long reaction times /J. Amer. Oil Chemists Soc. 53, 60 (1976)/.

From US-PS 4 267 123 (examples 1 and 5) it is known that propansulfonates $-CH_2CH_2CH_2SO_3^-$ are obtained in addition to propyl sulfites ($-CH_2CH_2CH_2-O-SO_2^-$) with oxygen induced hydrogensulfite addition in allyl hetero compounds, whereby the propyl sulfites are the main product of the reaction. In methanol containing reaction mixtures the ratio propyl sulfite:propansulfonate is 80:15%, in a watery reaction solution only 93:3%.

In contrast thereto, in accordance with DD-PS 154 443 hydrogen sulfites are quantitatively added on allyl ammonium salts by forming uniform 3-sulfopropyl-ammonium betaines (sulfobetaines), if the oxygen induced reaction is catalized by transitional metal ions.

It is an object of the subject invention to provide novel 3-sulfopropyl-ammonium betaines with valuable characteristics and thereby to make possible the introduction of the sulfonic acid group and an additional hydrophilic acid function in allyl ammonium salts in such a manner that the forcible introduction of further hydrocarbon containing residues is not required.

This object is solved in accordance with the claim. The novel 2-substituted 3-sulfopropyl-ammonium betaines have the formula I

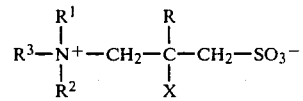

wherein
R is hydrogen or methyl group
X represents $SO_2M$ or $SO_3M$, whereby M may be a hydrogen or an alkali metal, like sodium or potassium, or also $NH_4^+$,
$R^1$ and $R^2$ independent from each other may be hydrogen, alkyl residues with 1 to 3 C-atoms, hydroxyalkyl residues, oxyalkylene residues with up to 10 ethylene oxide units or substitutes closed to a ring and
$R^3$ may be hydrogen or an alkyl residue with 1 to 22 C-atoms, whereby in the chain —NH—CO— or —CO—NH— may be contained.

The subject matter of the invention also relates to processes for making the compounds of formula I.

The novel compounds are obtained in accordance with the invention in that allyl ammonium salts or methallyl ammonium salts of the general formula II,

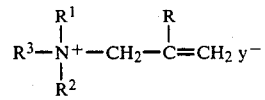

wherein
R, $R^1$, $R^2$ and $R^3$ have the aforementioned significance and $y^-$ represents an anion, preferably chloride or bromide,
and are reacted with a pH value range between 2.0 and 4.0 with at least the double amount of a hydrogen sulfite in the presence of a peroxo disulfate alone or in combination with other oxidation agents in a watery solution.

When the reaction occurs in the presence of catalytic amounts of the peroxo disulfate, the following sulfobetaine sulfinates are generated.

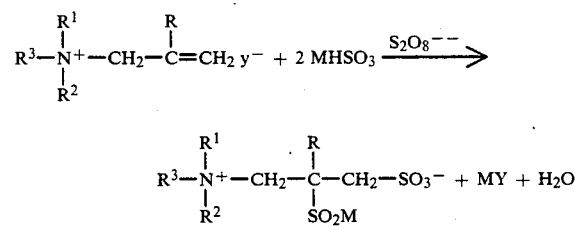

This difunctionalisation with two oxygen containing sulfur functions shall be designated as sulfosulfination.

The reaction triggered by this mode of process differs basically from all hydrogen sulfite additions which were hitherto performed on allyl ammonium salts: One practically obtains with a complete reaction exclusively the sulfobetaine sulfinates by difunctionalisation on the double bond; their high selectivity is surprising for a reaction which is performed in accordance with the radical mechanism. The required reaction times are considerably shorter as with other reactions on the allyl ammonium group. The reactions occur in minutes or even seconds; they therefore belong to the fastest radical reactions which occur in solutions which is known to organic chemistry. The initiation of the sulfosulfination with peroxo disulfate was also surprising insofar as other per-compounds, like hydrogen peroxide or alkaliperborates (see example 12), were not able to trigger a comparable reaction, but merely oxidized sulfite into sulfate. Also, in accordance with the statements made in DE-OS 23 13 539 (page 4) combibations of peroxides with sulfites are considered to be unusable initiator systems.

In contrast to the recovery of the 3-sulfopropyl-ammonium-betaines (DD-WP 154 443) the components are not added simultaneous drop by drop, but the components and the initiator are added together at one time. Since this can occur by admixing at the beginning of a dwell time path, the reaction may be performed continously. In view of the very high room-time-yield of the inventive process, relative small reaction rooms may be used for the discontinous mode of operation as well as for the continous reaction performance.

Figure 2:
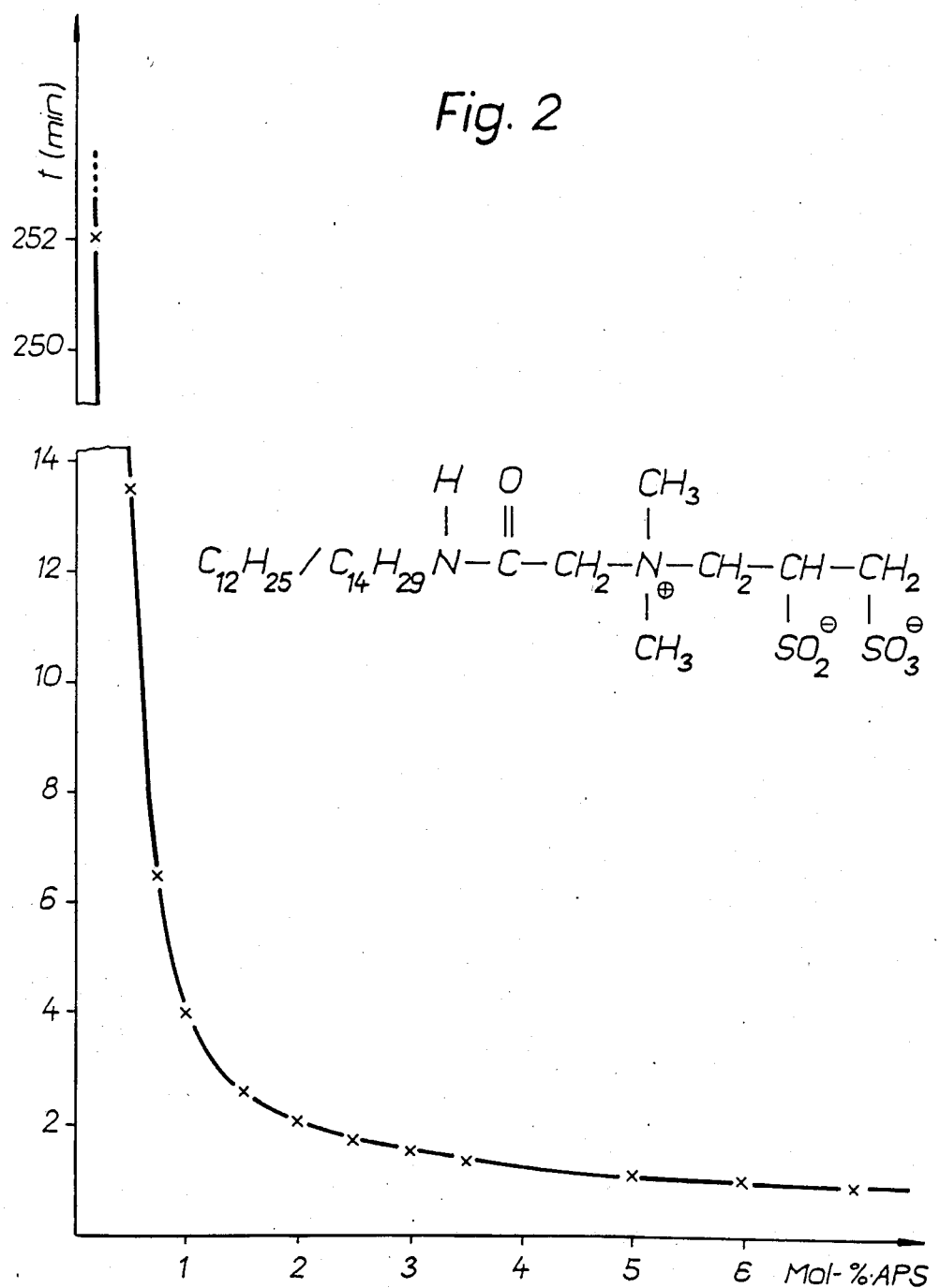

The amount of initiator used is somewhat different for short chain allyl ammonium salts (FIG. 1) and long chain representatives with a tenside character (FIG. 2). Under practical conditions initiator amounts between 1 and 3 Mol-% $S_2O_8{}^{--}$ should be used. While a low amount of peroxo disulfate may result in an incomplete reaction, the sulfosulfination is being so accelerated when using too large amounts of initiators that the reaction becomes uncontrollable (see example 9); the increase of the concentration of the allyl ammonium salt in the solution and the increase of the initial temperature also result in acceleration; reversely, the sulfosulfination may be tempered by diluting or cooling (see example 10). It is also possible to initiate with a low amount of peroxo disulfate and then to complete the reaction by the effect of air or oxygen (see example 9/FIG. 1; Example 27/FIG. 2).

As had been shown the optimum mol ratio of the components as well as the pH-value are changed when feeding air and discharge sulfur dioxide, wherby the simultaneous forming of 3-sulfopropyl-ammonium betaine is initiated (see example 11). Noticeable amounts of this side product are obtained in the range above the pH-value 4. The strong influence of the pH-value on the relationship of formed sulfobetaine sulfinate with respect to sulfobetaine are shown in examples 3 to 8 in table 1 and the examples 19 to 21 in table 2.

For making the sulfobetaine sulfinates one preferably operates in a watery solution with high concentration of the reaction partners, by mixing solutions of allyl ammonium salts or methallyl ammonium salts with a 35 to 41% solution of the hydrogen sulfite and by adding the initiator as a solution or as a solid substance. In other cases one would dissolve solid alkali metabisulfite $M_2S_2O_5$ in the solutions of substituted allyl ammonium salts or to dissolve solid substituted allyl ammonium salts in alkali hydrogen sulfite solutions, so as to be able to operate in a concentrated manner. Solution mediators in form of low alcohols may be used, if need be; they do not influence the reaction of the direction. Cooling of the reaction mixtures is normally not required, since, beginning at room temperature, the temperatures increase at a maximum of about 30° to 40° C. The initial-pH-value may be adjusted by adding some mineral acid, if need be, if, for example, technical hydrogen sulfite solutions contain a constituent of neutral sulfite (see examples 9 and 10). The obtained sulfobetaine sulfinates may be either isolated or may be further reacted as an intermediary product without isolation.

Also, the reaction may be performed in the presence of molar amounts of the peroxo disulfate, however the following sulfobetaine sulfonate are generated

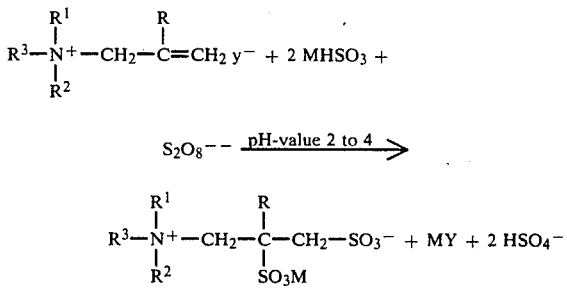

The reaction triggered by this mode of process also differs basically in its sequence and endproduct from all hydrogen sulfite additions hitherto preformed on allyl compounds. With a complete reaction in the short reaction time of a few minutes one obatains exclusively 2,3-disulfopropyl-ammonium betaines by difunctionalisation of the double bound; this high selectivity is surprising for a reaction performed in accordance with the radical mechanism. Since in the absence of allyl compounds peroxo disulfates with hydrogen sulfites react into sulfates in a generally known redoxreaction, it could not be expected that allyl double compounds would subject to a quantitative vicinal difunctionalisation with a high selectivity and yield. It is further a surprising finding that the reaction is specifically bound to the presence of peroxo disulfates. Other per-compounds, for example, hydrogen peroxide or alkali perborate do not trigger a comparable reaction, but merely oxidize sulfite into sulfate.

However, it is possible to use, in specific cases, peroxo disulfates and other per-compounds or even other oxidation agents together in such a manner that less than the molar amount of peroxo dislufate per Mol allyl compound is required. Suitable are, for example, hydrogen peroxide, chlor, chlorate, bromate etc.

Preferably one operates in accordance with the inventive process that the allyl ammonium salts are mixed with the two molar amount of hydrogen sulfite in a watery solution, adjusting the pH-value from 2 to a maximum of 4 and to add the peroxo disulfate in a single molar amount under stirring, whereby the progressive reaction is recognizeable by a rapid heating which could reach the boiling point. Long chain substituted allyl ammonium salts result in sulfobetaine sulfonates with tenside characteristics, which in the described mode of operation precipitate from the reaction mixture and can be easily isolated and may be recovered in pure form. In other cases, the generated sulfuric acid is neutralized before the preparation and the sulfobetaine sulfonate is extracted from the inorganic salt constituent, if need be.

A continuous performance of the inventive process is possible in a suitable device, if the components in the stated Mol ratio are added in dosages at the beginning of a dwell time path.

It had been found that these novel sulfobetaine sulfinates are useable as active tensides as reactive intermediary products and also the sulfobetaine sulfinates as well as the sulfobetaine sulfonates in a wide pH-value.

EXEMPLIFIED EMBODIMENTS

The $^{13}$C-NMR-spectrums which are mentioned in the following examples were measured in $D_2O$, as an external standard TMS was used. The stated numbers on the C-atom symbols of the structure formulas correspond to the chemical displacements in ppm.

Examples 1 to 9

The general operating specification for sulfosulfination of dimethyl allyl amine hydrochloride in dependency from the initial pH-value to pure sodium-dimethyl-(2-sulfinato)-3-sulfopropyl-ammonium betaine ($R^1=R^2=CH_3$; $R=R^3=H$; $X=SO_2Na$ in the general formula I) and their mixtures with dimethyl-3-sulfopropyl-ammonium betaine ($R^1=R^2=CH_3$; $R=R^3=H$; X is replaced in the general formula I by H).

185 g (1 mol) 65.65% dimethyl allyl amine hydrochloride solution are succesively introduced into a sulfonation flask provided with a stirrer, thermometer and glass electrode, made by dissolving of fresh distilled dimethyl allyl amine in a concentrated hydrochloric acid, 516.5 g (2.02 mol) 40.7% technical sodium hydrogen sulfite solution with an iron content of 60 mg/l, as well as the corresponding amount 37% hydrochloride acid or 33% soda lye and water, so that the initial-pH-values of the reaction stated in table 1 from the pH-value 2 (example 1) to the pH-value 6 (example 8) are assured with an operating amount of 1 kg.

In the cases where larger amounts of soda lye are required for adjusting the pH-value, the initial solution heats up and therefore should be cooled to room temperature before the reaction, so as to assure of uniform initial conditions.

4.1 g (2 Mol-%) finely powdered sodium peroxo disulfate is added all at once into the prepared pale yellow initial solution, whereby the peroxo disulfate dissolves immediately, the reacting mixture heats up and assumes a blood red color, in particular at initial-pH-values under 5.

The following summary shows the exothermic time sequence of the sulfosulfination with a pH-value 4 (see table 1; example 4)

| Time (s) | 0 | 30 | 50 | 70 | 90 | 120 | 180 |
|---|---|---|---|---|---|---|---|
| Temperature (°C.) | 22.5 | 25.5 | 33 | 43 | 45.5 | 46 | 46 |

The reaction is completed after reaching the maximum temperature. An aliquot portion of the recovered reaction solution is reduced in a vacuum into a salt like residue and its composition is determined by comparing the intensities of suitable signals of the $^1$H-NMR-spectrum.

Table 1 illustrates the dependency of the sulfobetaine sulfinate yield, the time until reaching the maximum temperature after the initiation as well as the temperature difference (initial temperature to maximum temperature) reached from the given pH-value.

TABLE 1

Sulfosulfination of dimethyl allyl amine hydrochloride by variation of the pH-value

| Example | pH-value | sulfinate yield (%) | maximum temperature after initiation (min) | temperature difference (°C.) |
|---|---|---|---|---|
| 1 | 2.0 | 100 | 2 | 20.5 |
| 2 | 2.5 | 100 | 2 | 23 |
| 3 | 3.0 | 96 | 2 | 23 |
| 4 | 4.0 | 91 | 2 | 23.5 |
| 5 | 4.5 | 83 | 2 | 22.5 |
| 6 | 5.0 | 75 | 2 | 13.5 |
| 7 | 5.5 | 65 | 2 | 9.5 |
| 8 | 6.0 | 50 | 2 | 6.5 |

In this manner the sulfobetaine sulfinate can be obtained in a pure form only from an initial-pH-value$\leq 2,5$. At higher pH values (examples 3 to 8) the constituent of dimethyl-3-sulfopropyl-ammonium betaine steadily increases. In all examples the maximum temperature is reached in 2 minutes after the initiation, however the reaction remains incomplete in particular in the examples 6 to 8, as can be seen from the measured temperature differences. The reaction can be completed either by increasing the initiator concentration or by an additional stirring in of air oxygen; however, an increase in sulfobetaine sulfinate yield could not be proven with these pH-values.

Example 9

Sulfosulfination of dimethyl allyl hydrochloride by varying the initiator concentration for sodium-dimethyl(2-sulfinato)-3-sulfopropyl-ammonium betaine ($R^1=R^2=CH_3$; $R=R^3=H$, $X=SO_2Na$ in the general formula I).

In this example the dependency of the duration of the exothermic sulfosulfination of a reaction solution with a pH-value 2.5 (1 mol dimethyl allyl amine hydrochloride and 2.1 mol sodium hydrogen sulfite/kg reaction solution) from the initial initiator amount (ammonium peroxo disulfate-APS), which varied between 0 Mol-% and 8 Mol-%, should be illustrated in a test series. The total result is illustrated in FIG. 1.

In a range of 0.5 Mol-% peroxo disulfate and less the reaction is initiated by the per-compound in the initial phase and can then be continued by oxygen effect. The exclusive initiation with air oxygen to the completed reaction requires much longer reaction times; the maximum temperature is reached after 50 minutes, but the reaction is not complete at this time (see example 12). When using higher peroxo disulfate concentrations, for example, 8 Mol-% only 20 seconds are required for the complete reaction, still higher concentrations result in an explosive type of boiling of the mixture immedeately after addition. Representative from the test series the initiating with 2 Mol-% ammonium peroxo disulfate should be described:

85 g (1 mol) 65.65% dimethyl allyl amine hydochloride solution, 618.5 g (2.1 mol) 35,33% technical sodium hydrogen sulfite solution with a $Fe^{++}$-content of 8 mg/1,10 g 37% hydrochloric acid and 171,5 g water are combined with each other under stirring. The pH-value of the solution is 2.5. Thereafter, a solution of 4.56 g (2 Mol-%) ammonium peroxo disulfate is added all at once in 10,44 g water. The solution assumes a red color and the maximum temperature is reached after 3 minutes, which indicates the completion of the sulfosulfination:

| Time (min) | 0 | 0.5 | 1 | 2 | 3 | 5 |
|---|---|---|---|---|---|---|
| Temp. (°C.) | 20 | 31 | 40 | 42.5 | 43 | 43 |

Example 10

This example should show the increase of the reaction speed of the sulfosulfination of dimethyl allyl amine hydrochloride into sodium-dimethyl-(2-sulfinato)-3-sulfopropylammonium betaine ($R^1=R^2=CH_3$; $R=R^3=H$; $X=SO_2Na$ in the general formula I) with a higher initial concentration of the partners as well as reducing the reaction speed by lowering the initial temperature.

For making a solution whose pH-value is 2, the following is admixed:

185 g (1 mol) 65.65% dimethyl allyl amine hydrochloride solution, 534.3 g (2.1 mol) 40.9% technical sodium hydrogen sulfite solution and 21,4 g 37% hydrochloric acid. Subsequently, finely powdered sodium peroxo disulfate was added all at once under stirring. The reacting solution immediately assumes a red color and within one minute the temperature is increased from 22° to 50° C., whereby the reaction is quantitative. However, if the test is repeated at an initial temperature of 0° C., the pale yellow reaction solution assumes a red color only after 1.5 minutes and reaches the maximum temperature only after 4 minutes. The time sequence at different initial temperatures:

| Time (min) | 0 | 0,5 | 1 | 2 | 3 | 4 | 5 |
|---|---|---|---|---|---|---|---|
| Temp. (°C.) | 0 | 5 | 10 | 22 | 29.5 | 30 | 30 |
|  | 22 | 30 | 50 | 49.2 | 49 | — | — |

20 ml water are distilled off from the reaction solution in a vacuum, so as to remove the remaining sulfur dioxide. One neutralizes with soda lye and adds a few drops 30% $H_2O_2$. After filtering off from iron(III)-hydroxide the colorless reaction solution is reduced in a vacuum.

$^{13}C$—NMR-spectrum

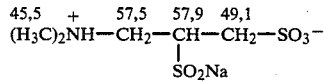

For isolating the free dimethyl-(2-sulfinic acid)-3-sulfopropyl-ammonium betaine the sodium salt is processed with the sufficient amount of concentrated hydrochloric acid. Thereafter, mainly sodium chloride is filtered off from the inorganic salts and the filtrate is evaporated in a vacuum, whereby the sulfinic acid crystallices as a colorless substance. A recrystallisation from water with the addition of ethanol is possible.

$^{13}C$—NMR-spectrum

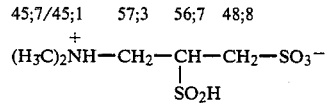

With respect the sodium salt the $N-CH_3$ groups of the sulfinic acid are nonequivalent.

The given salts (sulfobetaine sulfinate or sulfinate sulfonate) can be recovered formula poor by neutralisation of the sulfinic acid with a given base, if need be.

Example 11

This example and the following should demonstrate the initiating of the sulfosulfination of dimethyl allyl amine hydrochloride with further initiators, like oxygen, hydrogen peroxide and sodium perborate, as well as their inferiority with respect to the inventive process.

Sulfosulfination under stirring of oxygen

A mixture with the pH-value 2 from 1 mol dimethyl allyl amine hydrochloric acid, 2,1 mol sodium hydrogen sulfite solution and hydrochloride are made analog to example 10. The reaction is initiated and continued to the completion of the reaction by a vigorous stirring in of air oxygen into the solution in such a manner that air bubbles are constantly finely dispersed therein. The time sequence of the exothermic sulfosulfination is illustrated in the following summary:

| Time (min) | 0 | 30 | 60 | 75 | 85 |
|---|---|---|---|---|---|
| Temp (°C.) | 21.5 | 28 | 31 | 31.5 | 31 |

The maximum temperature has run through the reaction after a reaction time of 75 minutes, but the $^1H$-NMR-spectrum of a sample, which had been removed after 85 minutes, still indicates the initial material. However, the reaction is quantitative after 150 minutes.

The reaction product contains the sulfobetaine sulfinate in an amount of 91% in addition to 9% sulfobetaine.

The sulfosulfination product is obtained quantitatively in a considerable reduced reaction time during the analog reaction with a pH-value of 2 as well as initiating with sodium peroxo disulfate (see examples 1, 2 and 10).

Example 12

Sulfosulfination of dimethyl allyl amine hydrochloride with hydrogen peroxide as well as sodium perborate:

One proceeds as described in example 10, however 2 Mol-% 30% hydrogen peroxide are added all at once to the reaction mixture, instead of the sodium peroxo disulfate. The temperature of the solution increased by 2° C. within 10 seconds and then remains constant. No reaction toward the end product occurs.

With the same process one only gets the initial material back when using sodium perborate as the initiator. Only after adding additional peroxo disulfate to the reaction solution one obtains the quantitative reaction into sulfobetaine sulfinate, as already described in example 10.

Example 13

Sulfosulfination of N,N-dimethyl-2-methallyl amine hydrochloride

One proceeds as described in example 10 and reacts the combined solutions of 56 g total mass from 3.7 mg (30 mmol) N,N-dimethyl-2-methallyl ammonium hydrochloride, 65 mmol sodium hydrogen sulfite, hydrochloric acid, tap water and 5 Mol-% sodium peroxo disulfate with a pH-value of 2,1. The reaction solution heats up to a maximum of 6.5° C., after the reaction had been initiated at room temperature.

After the reaction had been completed the solution is adjusted to the pH-value 11 by means of soda lye and $^{13}$C-NMR-spectroscopically tested. The spectrum shows that the product is not uniform, but consists of 1-dimethyl-amino-2-sulfinato-3-sulfanato-2-methylpropan-disodium salt and 1-dimethyl amino-2-methyl-3-sulfonatopropan sodium salt.

$^{13}$C-NMR-spectrum in ppm (all signals over 15% of the intensity with respect to the main signal at 45,6 ppm): 64.9; 60.8; 60.1; 56.6; 55.9; 49.4; 49.0; 45.6; 39.9; 28.5; 19.5; 16.5.

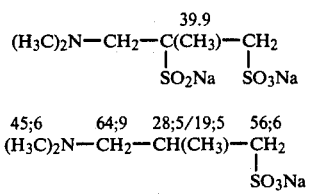

Example 14

Sodium-diethyl-(2-sulfinato)-3-sulfopropyl-ammonium betaine ($R^1=R^2=C_2H_5$; $R=R^3=H$; $X=SO_2Na$ in the general formula I) by sulfosulfination of diethyl allyl amine hydrochloride One proceeds in accordance with example 10 and reacts the combined solutions of 855 g total mass from 1 mol diethyl allyl amine hydrochloride, 2.1 mol sodium hydrogen sulfite, hydrochloric acid and 2 Mol-% sodium peroxo disulfate with a pH-value of 2.5. The exothermic sulfosulfination has the following time sequence; the reaction solution assumes a blood red color after about one minute:

| Time (s) | 0 | 30 | 60 | 90 | 110 | 150 |
|---|---|---|---|---|---|---|
| Temp. (°C.) | 19 | 20 | 33 | 45 | 45;5 | 45;3 |

$^{13}$C—NMR-spectrum of the reaction product:

```
    10;3  49;6    +      57;1  52;1  49;1
    (H3C—CH2)2NH—CH2—CH—CH2—SO3⁻
                        |
                        SO2Na
```

The free diethyl-(sulfinic acid)-3-sulfopropyl-ammonium-betaine can be isolated in accordance with the mode of process described in example 10. Colorless, crystalline substance, may be recrystallized with water by adding ethanol, with the $^{13}$C—NMR-spectrum:

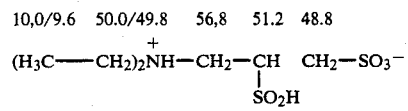

In contrast to the sodium salt, the ethyl groups in the free sulfinic acid are not equivalent.

Example 15

Sodium-(2-sulfinato)-3-sulfopropyl-ammonium betaine ($R=R^1=R^2=R^3=H$; $X=SO_2Na$ in the general formula I) by sulfosulfination of allyl amine hydrochloride One proceeds as described in example 10 and reacts the combined solutions of 715 g total mass from 1 mol allyl amine hydrochloride, 2.05 mol sodium hydrogen sulfite, hydrochloric acid and 2 Mol-% sodium peroxo disulfate with a pH-value of 2.5.

The time sequence of the increase in temperature of the exothermic sulfosulfination is illustrated in the following summary:

| Time (s) | 0 | 10 | 20 | 30 | 40 | 50 | 100 | 180 |
|---|---|---|---|---|---|---|---|---|
| Temp (°C.) | 24 | 30. | 48 | 54 | 55;5 | 55;7 | 55;7 | 55 |

$^{13}$C—NMR-spectrum of the reaction product:

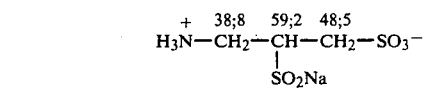

The free (2-sulfinic acid)-3-sulfopropyl-ammonium betaine may be isolated as a crystalline substance in the mode of process described in example 10.

$^{13}$C—NMR-spectrum:

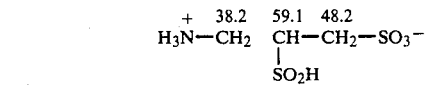

Examples 16 to 22

These examples describe the making of pure sodium-trimethyl-(2-sulfinato)-3-sulfopropyl-ammonium betaine ($R=H$; $R^1=R^2=R^3=CH_3$; $X=SO_2Na$ in the general formula I) and their mixtures with trimethyl-3-sulfopropyl-ammonium betaine ($R^1=R^2=R^3=CH_3$; $R=X=H$ in the general formula I) from trimethyl allyl ammonium chloride and the dependency of the sulfosulfination from the pH-value.

One proceeds as stated in the general operating specification of examples 1 to 8 and react with initial-pH-values, which are stated in table 2, 1 mol trimethyl allyl ammonium chloride, 2.02 mol sodium hydrogen sulfite and 2 Mol-% sodium- or potassium peroxo disulfate, kg reaction mixture.

The sulfosulfination with the pH-value 4 is described representative for this test series:

341.6 g (1 mol) 39.7% trimethyl allyl ammonium chloride solution, 516.5 g (2,02 mol) 40.7% technical sodium hydrogen sulfite solution (iron content 60 mg/l), 2 g 37% hydrochloric acid and 134.5 g tap water are reacted with 5.4 g (2 Mol-%) porexo disulfate.

The reacting solution heats up in the following manner after the initiation:

| Time (min) | 0 | 1 | 2 | 3 | 3.5 | 4 | 6 |
|---|---|---|---|---|---|---|---|
| Temp. (°C.) | 24 | 27 | 36 | 46 | 47.5 | 48 | 48 |

An aliquot portion of the recovered reaction solution is reduced in a vacuum to a salt like residue and the composition is determined by comparing the intensities of suitable signals of the $^1$H-NMR-spectrum.

Table 2 shows the dependency of the sulfobetaine sulfinate yield, the time duration until reaching the maximum temperature of the preparation after the initiation as well as the temperature difference reached from the initiating temperature to the maximum temperature from the given adjusted pH-value.

TABLE 2

Sulfosulfination of trimethyl allyl ammonium chloride under variation of the pH-value

| Example | pH-value | Sulfinate yield (%) | maximum temperature after initiation (min) | temperature difference (°C.) |
|---|---|---|---|---|
| 16 | 1.75 | 100 | 3 | 18 |
| 17 | 2.0 | 100 | 3 | 21 |
| 18 | 2.5 | 95 | 3 | 23 |
| 19 | 2.8 | 88 | 3 | 23 |
| 20 | 3.4 | 84 | 3 | 23 |
| 21 | 4.0 | 51 | 4 | 24 |
| 22 | 5.0 | 42 | 8 | 17 |

In this manner the sulfo betaine sulfinate can only be maintained pure with an initial-pH-value $\leq 2$.

The reaction product recovered in accordance with example 17 shows the followng $^{13}$C-NMR-spectrum:

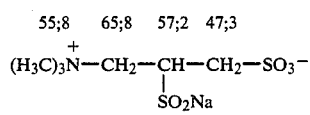

The constituent of trimethyl-3-sulfopropyl-ammonium betaine increases steadily with higher pH-values (examples 18 to 22). The maximum temperature is reached 3 to 8 minutes after the initiation, but the reaction remains at first incompleted, in particular in the examples 16 and 22, as can be concluded from the measured temperature differences. Only by increasing the initiator concentration or by an additional stirring in of air oxygen can the reaction be completed; an increase of the yield in sulfobetaine sulfinate could not be observed with these pH-values.

Examples 23 to 27

Sodium-alkyl dimethyl-(2-sulfinato)-3-sulfopropyl-ammonium betaine ($R^1=R^2=CH_3$; $R^3=$alkyl; $R=H$; $X=SO_2Na$ in the general formula I) by sulfosulfination of alkyl dimethyl allylammonium salts.

TABLE 3

Sodium-alkyl dimethyl-(2-sulfinato)-3-sulfopropyl-ammonium betaines $$\text{alkyl}-\overset{+}{N}(CH_3)_2-CH_2-\underset{\underset{SO_2Na}{|}}{CH}-CH_2-SO_3^-$$

| Example | $R^3$(alkyl) | melting point (°C.) |
|---|---|---|
| 23 | $C_4H_9$ | decomposition > 243 |
| 24 | $C_8H_{17}$ | decomposition > 232 |
| 25 | $C_{10}H_{21}$ | decomposition > 248 |
| 26 | $C_{12}H_{25}$ | decomposition > 244 |
| 27 | $C_{16}H_{33}$ | decomposition 147 to 153+ |

+Na = H

One proceeds in accordance with one of the aforementioned examples and react the combined solutions from the given alkyl dimethyl allyl ammonium salt, ammonium- or alkali hydrogen sulfite with a pH-value of 2 with ammonium- or alkali peroxo disulfate.

Thereby, the crystalline alkyl dimethyl allyl ammonium salts may be used. In the case of the hexadecyl ammonium salt, the hydrogen sulfite solution must be heated to about 40° C., so that the salt dissolves.

The longer chain sulfinates crystallize in particular in the cooling reaction solution after the sulfosulfination has been completed.

The separation of the pure sulfobetaine sulfinates from the inorganic salts may also be performed by extracting the evaporated solutions with about 80% watery ethanol.

The recovery of the free sulfinic acid may also be performed in accordance with the processes described in the aforementioned examples. The given salts may be recovered formula pure by neutralisation of the sulfobetaine sulfinic acids with a given base.

Example 28

Sodium-N-dodecyl/tetradecyl amino carbonyl methyl-N,N-dimethyl-(2-sulfinato)-3-sulfopropyl-ammonium betaine ($R^1=R^2=CH_3$; $R^3=CH_2-CON-H-C_{12}H_{25}/C_{14}H_{29}$; $R=H$; $X=SO_2Na$ in the general formula I) by sulfosulfination of N-dodecyl/tetradecyl amino carbonyl methyl-N,N-dimethyl allyl ammonium chloride under variation of the initiator concentration (see FIG. 2)

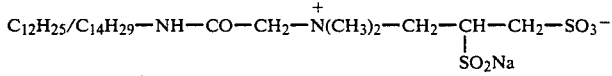

Synthesis of the initial product

N-methoxy-carbonyl-methyl-N,N-dimethyl allyl ammonium chloride 850 g (10 mol) allyl dimethyl amine are placed into a reaction container. 1085 g (10 mol) chlor acetic acid methyl ester were added drop by drop. During the drop by drop addition the temperature increases slowly and is maintained between 60° and 70° C. by occasional cooling. The reaction product which had been obtained in a quantitative reaction, which is reached after 30 minutes, is clear and viscous.

N-dodecyl/tetradecyl amino carbonyl methyl-N,N-dimethyl allyl ammonium chloride 1990 g (10 mol) of liquified dodecyl/tetradecyl amine-mixture (cocos amine, component ratio about 1:1) is added to the aforedescribed methyl ester-ammonium chloride drop by drop for about 30 minutes in such a manner that the reaction temperature does not exceed about 70° to 80° C. A highly viscous end product is obtained with a pH-value of 7.

As already described in example 9, in an analog manner, the dependency of the duration of the exothermic sulfosulfination of 1 mol of the allyl ammonium chloride, which was made in accordance with the aforementioned specification, was tested with 2.1 mol sodium hydrogen sulfite in 1.1 kg reaction mixture (pH-value 2.2) by the initiator concentration.

The ammonium peroxo disulfate (APS) which had been used as the initiator was varied between 0 Mol-% and 8 Mol-%. The given initial temperature is 20° C.

The total result is illustrated in FIG. 2. A comparison with FIG. 1 (example 9) shows a similar sequence with initiator amounts from 0.5 to 8 Mol-%, namely increasing reaction speed. Less than 0.5 Mol-% initiate the sulfosulfination in the initial phase, however the completion of the reaction can only be achieved by an additional stirring in of air oxygen, while no technically useable reaction speed can be obtained with air oxygen alone.

The time sequence of the sulfosulfination with 2 Mol-% APS, by way of example, is shown in the following summary:

| Time (s) | 0 | 30 | 60 | 90 | 120 | 125 | 300 |
|---|---|---|---|---|---|---|---|
| Temp. (°C.) | 20 | 23.5 | 29 | 36 | 41 | 41.5 | 41.5 |

The initially pale yellow suspension is colored orange shortly after adding the initiator, it becomes homogeneous and appears milky white due to the stirred in air bubbles. The cooled reaction solution represents a homogeneous, clear transparent syrupy solution of a pale yellow color.

The separation of the pure sulfobetaine sulfinate from the melting point 192° C. (decomposition) from the inorganic salts may be performed by extracting the evaporated solution with about 80% watery alcohol.

Example 29

Sodium-N-hexadecyl/octadecyl-amino carbonyl methyl-N,N-dimethy-(2-sulfinato)-3-sulfopropyl-ammonium betaine $(R^1 = R^2 = CH_3;$
$R^3 = CH_2-CO-NH-C_{16}H_{33}/C_{18}H_{37}; R = H;$
$X = SO_2Na$ in the general formula I)

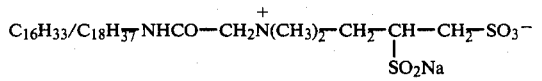

The N-hexadecyl/octadecyl-amino carbonyl methyl-N,N-dimethyl allyl ammonium chloride (1 mol) which is required as the initial product is made in accordance with example 28 from N,N-dimethyl-allyl amine, chlor acetic acid methyl ester as well as from the 1:1 mixture of hexadecyl-or octadecyl amine and with 2.1 mol sodium hydrogen sulfite in the presence of 2.5 Mol-% ammonium peroxo disulfate in 1,6 kg reaction mixture with a pH-value of 2.1 and at an initial temperature of 40° C.

The sulfobetaine sulfinate separates practically completely from the cooling reaction solution. Melting point: 128° C. (decomposition) from 90% ethanol.

Example 30

Sodium-N-/di-(dodecyl/tetradecyl amino carbonyl)/-methyl-N,N-dimethyl-(2-sulfinato)-3-sulfopropyl-ammonium betaine $(R^1 = R^2 = CH_3; R^3 = CH(CONH-C_{12}H_{25}/C_{14}H_{29})_2;$
$R = H; X = SO_2Na$ in the general formula I)

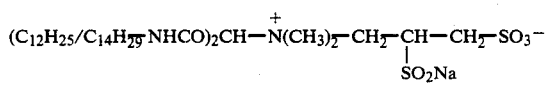

The allyl ammonium salt being required as the initial product is made in the following manner:

85 g (1 mol) dimethyl allyl amine is dissolved in 200 ml ethanol. 239 g (1 mol) brome malonic acid diethyl ester is added to this solution drop by drop under stirring at 20° C. and thereafter heats for 4 hours to 78° C. Subsequently, 398 g (2 mol) dodecyl/tetradecyl amine mixture (cocos amine, component ration about 1:1) is gradually added to this solution. Heating is performed for 6 hours at a temperature of 80° C. to complete the reaction and thereafter the largest amount of the solvent is removed in a vacuum. 2.1 mol sodium hydrogen sulfite, water and concentrated hydrochlorid acid are added to the remaining allyl ammonium bromide, resulting in 1,6 kg of a homogeneous initial solution with a pH-value of 2.3. The sulfosulfination is performed as described in the aforegoing examples, after heating this mixture to 40° C. as well as by adding 3 Mol-% ammonium peroxo disulfate.

The sulfobetaine sulfinic acid starts to crystallize as a yellowish product during cooling.

A sample recrystallized in ethanol had a melting point 74° to 76° C.

Example 31

Sodium-N-octanoyl amido ethyl-N,N-dimethyl-(2-sulfinato)-3-sulfopropyl-ammonium betaine $(R^1 = R^2 = CH_3;$ $R^3 = C_7H_{15}CONH-CH_2-CH_2;$ $R = H; X = SO_2Na$ in the general formula I)

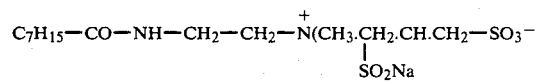

The allyl ammonium chloride being required as the initial product is made from octanoic acid methyl ester, N,N-dimethyl ethylene diamine and allyl chloride.

1 mol of the allyl ammonium chloride, 2.1 mol sodium hydrogen sulfite, hydrochlorid acid for adjusting the pH-value to 2.2 and water are combined to a solution of 1.6 kg, as well as reacted with 2 Mol-% ammonium peroxo disulfate. The reacting mixture did heat up to 33.5° C. within 20 minutes and the reaction was completed.

After preparing and recrystallization from 80% watery ethanol, the sulfobetaine sulfinate could be isolated from the melting point decomposition 209° C. in a substantial quantitative yield.

Example 32

Sodium-N-pentadeca fluoro-octanoyl amidoethyl-N-N-dimethyl-(2-sulfinato)-3-sulfopropyl-ammonium betaine $(R^1 = R^2 = CH_3; R^3 = C_7F_{15}CONH-CH_2CH_2;$ $R = X; X = SO_2Na$ in the general formula I)

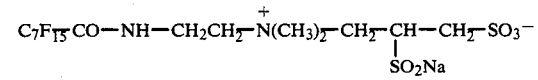

The allyl ammonium chloride being required as the initial product may be made from pentadeca fluoro-octanoic acid chloride, N,N-dimethyl-ethylen diamine and allyl chloride.

0.1 mol of the allyl ammonium chloride, 0.21 mol sodium hydrogen sulfite, hydrochloric acid for adjusting the pH-value to 2.2 and water are combined into a solution of 160 g, and is then reacted with 2 Mol-% ammonium peroxo disulfate. The reacted mixture heated from 20° to 35° C. within 2 minutes, whereupon the reaction was completed.

After preparing and recrystallisation from 50% watery acid ethanol the sulfobetaine sulfinic acid could be isolated in a substantial quantitative yield from melting point 138° to 140° C. (The sodium salt of this sulfobetaine sulfinic acid is heavily hygroscopic).

Example 33

Sodium-dimethyl-2,3-disulfo propyl-ammonium betaine ($R^1=R^2=CH_3$; $R=R^3=H$; $X=SO_3Na$ in the general formula I) from dimethyl allyl amine hydrochloride.

310 g (1 mol) 39.2% watery dimethyl allyl amine hydrochloride solution, 533.6 g (2 mol) 39% technical sodium hydrogen sulfite solution with an iron content of 9 mg/mol solution as well as 30 g 37% hydrochloric acid are admixed into a homogeneous solution in a sulfonation flask which is provided with a stirrer, a return flow cooler, a drop funnel and a thermometer, whereby the pH-value of this solution was 2.15. (glass electrode). A 40% watery sodium peroxo disulfate solution consisting of 238.1 g (1 mol) sodium peroxo disulfate ($Na_2S_2O_8$) and 357.15 g water was efficiently added to the prepared pale yellow initial solution. After 2 minutes about 60% of this solution was added and the red colored solution did heat up from 21° to 94° C. The addition of the oxidation agent is continued, whereby the reaction solution became increasingly lighter and finally became colorless, after about 90% of the peroxo disulfate solution was added. The excess reaction heat of the solution, which in the meantime boiled, could be easily discharged by boiling cooling, so that after 4 minutes the adding of the peroxo disulfate solution was finished.

The following summary shows the time sequence of the exothermic reaction during the dosaging phase of the oxidation agent:

| Time (min) | 0 | 0,5 | 1 | 2 | 3 | 4 | 5 |
|---|---|---|---|---|---|---|---|
| Temp. (°C.) | 21 | 60 | 75 | 94 | 103 | 103 | 101 |

A $^1H$-NMR-spectrum which had been prepared at this point in time from the solution acknowledged the quantitative and selective reaction of the allyl ammonium salt into the sulfobetaine sulfonate. After neutralising the heavy acid reaction solution with 33% soda lye the iron salt contained therein, because of the use of technical hydrogen sulfite solution, flocculated as iron-III-hydroxide and could be filtered off together with the largest part of the crystallized sodium sulfate.

The colorless filtrate showed the following $^{13}C$-NMR-spectrum: (the N—$CH_3$-groups are not equivalent)

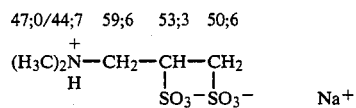

If the sulfobetaine sulfonate should be completely separtaed from its inorganic accompanying salts and should the free dimethyl-(2-sulfonic acid)-3-sulfopropyl-ammonium betaine isolated, one may proceed as follows: After reducing the aforementioned recovered reaction solution into a dry state, the obtained residue is reacted with a sufficient amount of concentrated hydrochloride acid and is well processed, filtered off from the undisolved sodium salts and evaporates the hydrochloric acid solution of the sulfobetaine sulfonic acid under reduced pressure into a dry state. Soon thereafter the sulfonic acid started to crystallize as a white substance. The sulfonic acid, which starts to slowly decompose at 120° C., can be easily recrystallized from water.

The $^{13}C$-NMR-spectrum of this acid is identical with the corresponding sodium salt.

The given salts (sulfobetaine sulfonate or disulfonate) may be recovered formula pure by neutralising the sulfonic acid with a given base, if need be. Disodium-3-dimethyl amino propan-1,2-disulfonate with 2 mol equivalent soda lye can be obtained, by way of example, with the following $^{13}C$-NMR-spectrum:

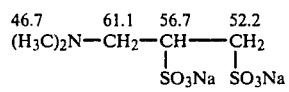

Example 34

Sodium-N,N-dimethyl-2-methyl-2,3-disulfo propyl ammonium betaine. One proceeds as described in example 33 and react instead of dimethyl allyl amine 7.4 g (30 mmol) 50% watery N,N-dimethyl-2-methallyl amine hydrochloride solution, 65 mol 39% sodium hydrogen sulfite solution and hydrochloric acid as a homogeneous solution from an initial-pH-value 2.0 with 65 mmol 40% sodium peroxo disulfate solution.

After the reaction is completed, the solution is adjusted to pH-11 by means of 33% soda lye, is separated from the crystallized sodium sulfate and is tested $^{13}C$-NMR-spectroscopically. The spectrum indicated a substance mixture from 1-dimethyl amino-2,3-disulfonato-2-methyl propan-disodium salt and 1-dimethylamino-2-methyl-3-sulfonato propan-sodium salt.

$^{13}C$-MMR-spectrum in ppm (all signals above 20% of the intensity with respect to the main signal at 27,9 ppm): 75.5; 64.2; 63.8; 58.8; 58.6 57.1; 56.2; 54.4; 49.0; 45.5; 45.2; 45.1; 45.0; 27.9; 21.5; 19.2;

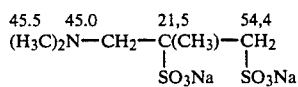

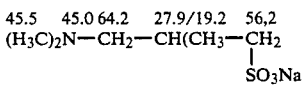

Example 35

Sodium-trimethyl-2,3-disulfo propyl ammonium betaine ($R^1=R^2=R^3=CH_3$; $R=H$, $X=SO_3Na$ in the general formula I) from trimethyl allyl ammonium chloride One proceeds as described in detail in example 33 and admixes with each other 341.6 g (1 mol) 39.7% trimethyl allyl ammonium chloride solution, 533.6 g (2 mol) 39% sodium hydrogen sulfite solution as well as 33 g 37% hydrochloric acid into a homogeneous solution, whose pH-value was 2.0. 595.25 g 40% sodium peroxo disulfate solution was added drop by drop during the course of 5 minutes. The following summary shows the time sequence of the exothermic reaction during the adding phase of the oxidation agent.

| Time (min) | 0 | 0,5 | 1,5 | 4 | 5 |
|---|---|---|---|---|---|
| Temp. (°C.) | 22 | 40 | 60 | 85 | 90 |

The reaction into sulfobetaine sulfonate was performed at this point in time quantitative and selective, as had been determined $^1$H-NMR-spectroscopically.

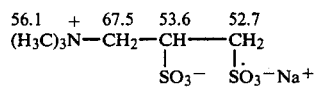

However, if the pH-value of the homogeneous solution is adjusted to values >2 at the start, the selectivity of the running reaction decreases, whereby in addition to trimethyl-2,3-disulfo propyl ammonium betaine also trimethyl-3-sulfo propyl ammonium betaine is formed in an increasing amount which finally becomes the main product of the reaction.

This factual situation will be demonstrated in the following example:

Example 36

The procedure in accordance with example 35 was followed and 1 mol trimethyl allyl ammonium chloride solution with 2 mol sodium hydrogen sulfite solution were admixe. As desecribed above 1 mol of a 40% sodium peroxo disulfate solution were added to the homogeneous solution with a pH-value of 4.0. The quantitative composition of the neutralised reaction solution was $^1$H-NMR-spectroscopically determined by comparing the intensities of suitable signals and showed that in addition of 59% trimethyl-2,3-disulfo propyl ammonium betaine also 41% trimethyl-3-sulfo propyl ammonium betaine were obtained (see DD-WP 154 443).

Example 37

This and the following example should show the suitability of oxidation agent combinations.

The procedure in accordance with examples 33 and 35 was followed and a homogenous solution with a pH-value of 2.0 was prepared from 1 mol trimethyl allyl ammonium chloride solution, 2 mol sodium hydrogen sulfite solution and hydrochloric acid, whereby a 15 Mol-% 30% of a 50% ammonium peroxo disulfate solution was added within the next 1,5 minutes and subsequently 85 Mol-% hydrogen peroxide are added with such speed that the exothermic reaction can be controlled by boiling cooling for which 4 minutes are required.

It could be shown $^1$H-NMR-spectroscopically that the allyl ammonium salt had been quantitatively reacted into sulfo betaine sulfonate.

The repitition of this test exclusively with hydrogen peroxide as the oxidation agent resulted merely in an oxidation of the sulfite into sulfate in addition to the unchanged initial product.

Example 38

The procedure of example 37 was followed and instead of 85 Mol-% hydrogen peroxide as an oxidation agent, chlor had been used. Only the sulfobetaine sulfonate could be $^1$H-NMR-spectroscopically proven. In contrast thereto, during the repitition of the test exclusively with chlor as the oxidation agent, no sulfobetaine sulfonate agent could be obtained; only an oxidation of the sulfite to sulfate occured.

Example 39

Sodium-diethyl 2,3-disulfo propyl ammonium betaine ($R^1=R^2=C_2H_5$; $R=R^3=H$; $X=SO_3Na$ in the general formula I) from diethyl allyl amine hydrochloride.

A homogeneous solution from 1 mol diethyl allyl amine hydrochloride, 1 mol sodium meta bisulfite ($Na_2S_2O_5$) and 37% hydrochloric acid was made in accordance with the aforementioned examples.

When adjusting an initial-pH-value of 2.0, the sulfobetaine sulfonate was quantitatively obtained. $^{13}$C-NMR-spectrum (the N-ethyl groups are not equivalent)

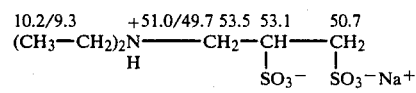

The isolation of the diethyl-(2-sulfonic acid)-sulfo propyl ammonium betaine may be performed in accordance with the mode of process described in example 33. The sulfonic acid was at first obtained as a high viscous colorless oil which crystallyzed after standing for a few days, but when seeded. The $^{13}$C-NMR-spectrum is practically identical with the sodium salt.

By neutralising the sulfobetaine sulfonic acid or the sulfobetaine sulfonate with soda lye, the disodium-3-diethyl amino propan-1,2-disulfonate was obtained with the following $^{13}$C-NMR-spectrum:

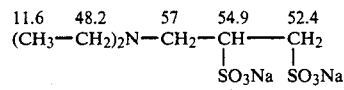

Example 40

Sodium-triethyl-2,3-disulfo propyl ammonium betaine ($R^1=R^2=R^3=C_2H_5$; $R=H$; $X=SO_3Na$ in the general formula I) from triethyl allyl ammonium bromide.

A homogeneous solution was prepared with a pH-value of 2.0 from 1 mol triethyl allyl ammonium bromide, 2 mol sodium hydrogen sulfite and hydrochloric acid and one proceeded in accordance with one of the aforementioned examples. The sulfobetaine sulfonate was obtained quantitatively and showed the following $^{13}$C-NMR-spectrum:

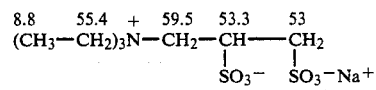

Example 41

Sodium-2,3-disulfo propyl ammonium betaine ($R=R^1=R^2=R^3=H$; $X=SO_3Na$ in the general formula I) from allyl amine hydrochloride A homogenous solution was prepared with a pH-value of 2.0 from 1 mol allyl amine, 2 mol sodium hydrogen sulfite and hydrochloric acid proceeding in accordance with example 37.

After neutralisation and filtering off of the insoluble iron-III-hydroxide, which was present in traces, the sulfobetaine sulfonate immediately started to crystallize from the cooled, colorless reaction solution A quantitative crystallisation may be obtained by adding ethanol. The product may be crystallized very well from water.

$^{13}$C—NMR—spectrum

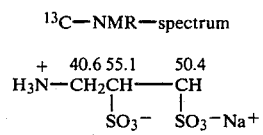

The free (2-sulfonic acid)-3-sulfo propyl ammonium betaine may be isolated in the mode of process described in example 33. A colorless crystalline substance is obtained which also can be easily recrystallized from water by adding ethanol. The $^{13}$C-NMR-spectrum of the free sulfonic acid is practically identical with the one of the sulfobetaine sulfonate.

The disodium-3-amino propan-1,2-disulfonate is abtained by neutralisation of the sulfobetaine sulfonic acid or the sulfobetaine sulfonate with soda ley with the following $^{13}$C-NMR-spectrum:

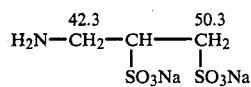

Examples 42 to 46

Sodium-alkyl-dimethyl-2,3-disulfo propyl ammonium betaines (R=H; R$^1$=R$^2$=CH$_3$; R$^3$=alkyl;; X=SO$_3$Na in the general formula I) from alkyl-dimethyl-allyl ammonium salts

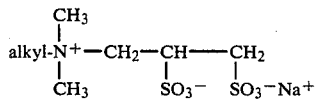

The procedure of one of the aforedescribed examples was followed and a homogenous solution with a pH-value 2.0 was made from 1 mol alkyl-dimethyl-allyl ammonium salt, 2-mol of a hydrogen sulfite, hydrochloric acid and water. The initial suspension had to be heated to about 40° C. in the case of the longer chain alkyl-dimethyl-allyl ammonium salts (alkyl>C$_{14}$), so that a homogenous initial solution was generated.

After the completed reaction with 1 mol of a peroxo disulfate or a peroxo disulfate/oxidation agent combination the longer chain reaction products (alkyl≦C$_{16}$) precipitate from the cooling solution. The free sulfobetaine sulfonic acids or the corresponding sulfobetaine sulfonates are separated depending whether the reaction mixture had been previously neutralized.

In the case of the short chain sulfobetaine sulfonates, they were separated from the inorganic accompanying salts by extraction of the residue of their evaporated solutions with an ethanol/water mixture (1:1 or 2:1)

TABLE 4

| Sodium-alkyl-dimethyl-2,3-disulfo propyl-ammonium-betaines | | |
|---|---|---|
| Example | R$^3$ (n-alkyl) | decomposition point (°C.) |
| 42 | C$_{10}$H$_{21}$ | >196 |
| 43 | C$_{12}$H$_{25}$ | >204 |
| 44 | C$_{14}$H$_{29}$ | >226 |
| 45 | C$_{16}$H$_{33}$/$_{18}$H$_{37}$ | >143+ |
| 46 | C$_{18}$H$_{37}$ | >165 |

+The free acid melts by decomposing at 162° C.

Example 47

Sodium-amino carbonyl methyl dimethyl-2,3-disulfo propyl ammonium betaine (R=H; R$^1$=R$^2$=CH$_3$; R$^3$=CH$_2$—CO—NH$_2$; X=SO$_3$Na in the general formula I)

The procedure of example 37 was followed and the homogeneous solution with a pH-value of 2.0 consisting of 1 mol amino carbonoyl methyl-dimethyl allyl ammonium chloride, which was made from dimethyal ally amine and chloracetamide, 2 mol sodium hydrogen sulfite and hydrochloric acid was reacted with ammonium peroxo disulfate/hydrogen peroxide by applying outer cooling, so that a reaction temperature of 60° C. was not exceeded. For preventing a hydrolysis of the acid amide function an immediate neutralisation with soda lye was performed, after the reaction had been completed.

However, if one wishes to react with peroxo disulfate only, analog to example 33, at least the double molar amount soda lye should be added simultaneously with the remainder of the peroxo disulfate (90 Mol-%), after about 10 Mol-% of the peroxo disulfate solution was added to the allyl ammonium salt, by maintaining a temperature of 60° C.

The sulfobetaine which had been recovered was separated from the inorganic accompanying salts by extracting the residue of the evaporated reaction solution with an ethanol/water mixture (1:1).

The sulfobetaine sulfonate which was recovered in a substantial quantitative yield with a decomposition point of 276° C. showed the following $^{13}$C-NMR-spectrum:

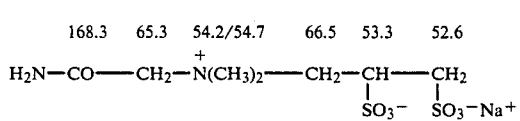

Example 48

Sodium-dodecyl/tetradecyl amino carbonyl methyl-dimethyl-2,3-disulfo propyl ammonium betaine (R=H; R$^1$=R$^2$=CH$_3$; R$^3$=CH$_2$—CO—NH—C$_{12}$H$_{25}$/C$_{14}$H$_{29}$; X=SO$_3$Na in the general formula I)

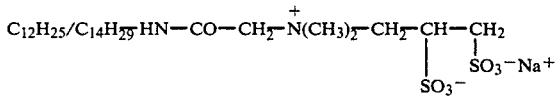

The procedure of example 47 was followd and dodecyl/tetradecylamino carbonyl methyl-dimethyl-allyl amonium chloride, which was made from dimethyl allyl amine, chlor acetic acid methyl ester and dodecyl/tetradecyl amine mixture (cocos amine, component ratio about 1:1) was reacted quantitative to sulfobetaine sulfonate from the melting point 158° C. (decomposition). The extraction of the sulfobetaine sulfonate was performed from the residue of the evaporated solution by a watery ethanol (70%).

Example 49

Sodium-di(dodecyl/tetradecyl amino carbonyl)methyl-dimethyl-2,3-disulfo propyl ammonium betaine (R=H; R$^1$=R$^2$=CH$_3$; R$^3$=CH(CO—N-

H—C$_{12}$H$_{25}$/C$_{14}$H$_{29}$)$_2$; X=SO$_3$Na in the general formula I)

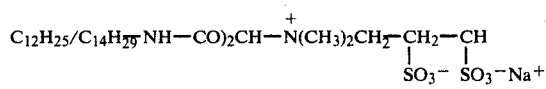

The procedure of example 47 was followed and di(-dodecyl/tetradecyl amino carbonyl)methyl-dimethyl-allyl ammonium bromide, which had been made from dimethyl allyl amine, brom malonic acid diethyl ester and dodecyl/tetradecyl amine mixture (cocos amine, component ratio about 1:1) was reacted with a reaction temperature of 40° C. quantitative nto into sulfobetaine sulfonate, The sulfobetaine sulfonate made in this manner precipitates during cooling of the reaction mixture; it was separated and recrystallized from ethanol. It has a melting point of 155° C. (decomposition).

Example 50

Sodium-octanoyl amido ethyl-dimethyl-2,3-disulfo propyl ammonium betaine (R=H; R$^1$=R$^2$=CH$_3$; R$^3$=CH$_2$—CH$_2$—NH—CO—C$_7$H$_{15}$; X=SO$_3$Na in the general formula I)

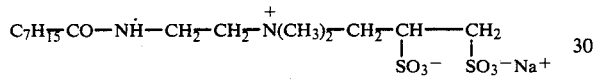

The procedure of example 47 was followed and the octanoyl amido ethyl dimethyl-allyl ammonium chloride, which was made from octanoic acid methyl ester, dimethyl ethylene diamine and allyl chloride, was reacted quantitative into the corresponding sulfobetaine sulfonate from the decomposition point >186° C. (recrystallized from 70° ethanol).

Example 51

Sodium-pentadeca fluoro octanoyl amido ethyl-dimethyl-2,3-disulfo propyl-ammonium betaine (R=H; R$^1$=R$^2$=CH$_3$; R$^3$=CH$_2$—CH$_2$—NH—CO—C$_7$F$_{15}$; X=SO$_3$Na in the general formula I)

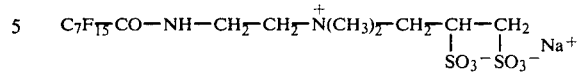

The procedure of example 47 was follwd and pentadeca fluoro octanoyl amido ethyl-dimethyl-allyl ammonium chloride, which was made from the pentadeca fuoro octanoic acid chloride, dimethyl ethylene diamine and allyl chloride, was reacted quantitative into crystalline sulfobetaine sulfonate from melting point 248° C. (decomposition), it was recrystallized from 70% watery ethanol.

We claim:
1. 2-substituted 3-sulfo propyl-ammonium betaine of formula I,

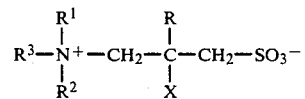

wherein:
(a) SO$_2$M or
(b) SO$_3$M, whereby M is selected from the group consisting of H, Na, K and NH$_4$,
(B) R is
(a) hydrogen or
(b) methyl,
(C) R$^1$ and R$^2$ independent from each other are
(a) hydrogen,
(b) alkyl with 1 to 3 C-atoms,
(c) 2-hydroxyethyl or
(d) oxyethylene residues with up to 10 ethylene oxide units, and
(D) R$_3$ is
(a) hydrogen or
(b) alkyl with 1 to 22 C-atoms, whereby —N-H—CO— or —CO—NH— may be contained in the chain.

* * * * *